United States Patent [19]

Bouiller et al.

[11] 3,744,861

[45] July 10, 1973

[54] BEARING

[75] Inventors: Jean Georges Bouiller, Brunoy; Raymond Jean Maurice Joubert, Savigny-sur-Orge, Louis Jules Bauger, deceased, late of Vanves, France; by Madeleine Henreitte Aimee Bauger, executrix, Vanves; Jeane Denise Olivier, La Ferte-Bernard; Armand Jean Baptiste Lacroix, Itteville, all of France

[73] Assignee: Societe Nationale D'Etude Et De Construction De Moteurs D'Aviation, Paris, France; by said Bouiller, Joubert and Lacroix

[22] Filed: Mar. 1, 1972

[21] Appl. No.: 230,637

[30] Foreign Application Priority Data
 Mar. 1, 1971 France .............................. 7106952

[52] U.S. Cl. .............................................. 308/187
[51] Int. Cl. ........................................... F16c 33/66
[58] Field of Search ....................... 308/187, 35, 77

[56] References Cited
UNITED STATES PATENTS
2,423,973  7/1947  Halford.................................. 308/35

Primary Examiner—Charles J. Myhre
Assistant Examiner—Frank Susko
Attorney—William J. Daniel

[57] ABSTRACT

A bearing arrangement for a shaft or a rotor comprising a main bearing and a lubricated safety journal bearing, in which the safety journal bearing comprises a revolving journal member integral with the shaft or rotor and a bearing member mounted with radial play in a stationary support and centered therein by the pressure in a chamber formed by parts of the bearing member and support and sealed by joints which provide the tightness of the radial play while allowing the bearing member to move radially, and in which the chamber is supplied with lubricating fluid under pressure which passes through channels in the bearing member to a radial clearance between the bearing member and the journal member to lubricate the safety bearing.

3 Claims, 2 Drawing Figures

PATENTED JUL 10 1973    3,744,861
FIG.:1
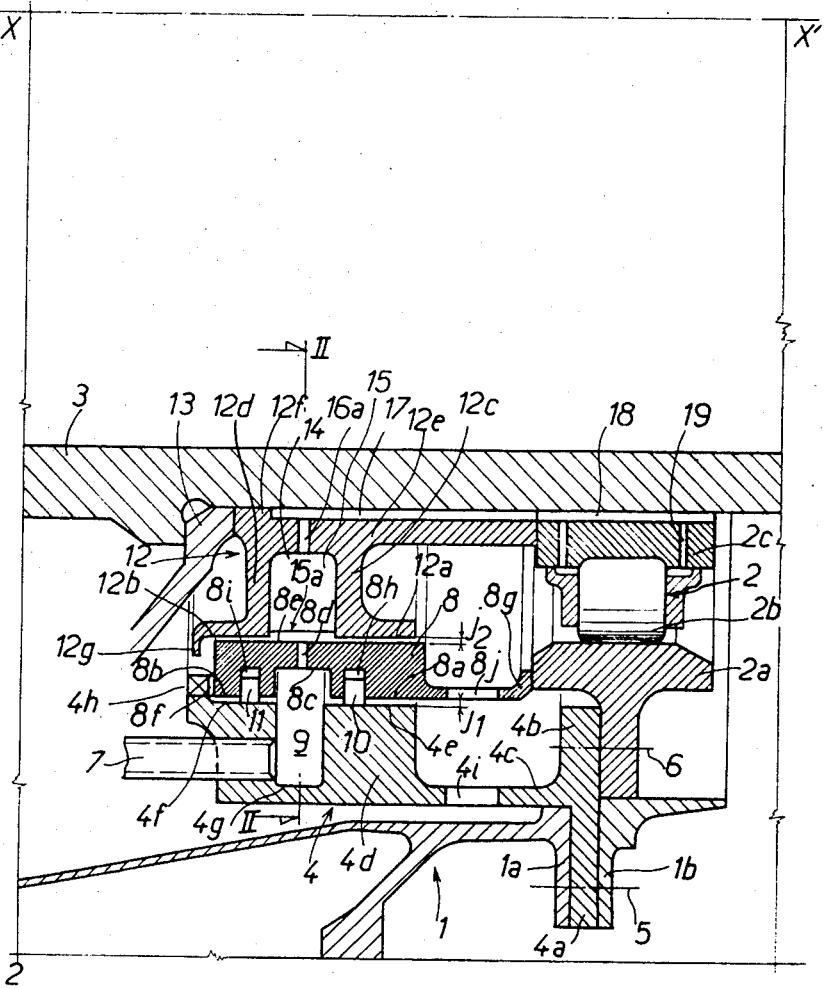
FIG.:2
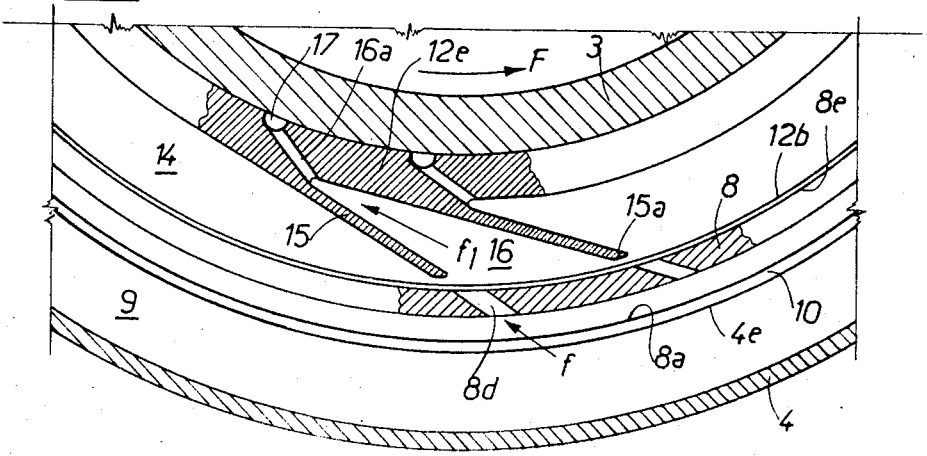

BEARING

The invention relates to bearings of all types, such as journal bearings, roller bearings, needle bearings, ball bearings, etc. . . . and particularly to the lubrication and to the cooling of bearings which are required to operate at high temperatures under substantial loads and at high speeds. It relates more particularly to the bearings of turbo engines and especially to jet engines.

The lubrication and cooling of a bearing may be effected either by oil under pressure, which requires a substantial oil flow rate so that the oil is usually cooled in a heat exchanger and recycled, or by means of pressurized "lost" oil in the form of an oil mist mixed with air. In the latter case, the required oil flow rate is reduced, but this cannot be recovered. It has already been proposed to circulate the lubricating fluid (either oil or a mixture of air and oil) by centrifugal action, but in this case, the fluid must be introduced inside or near the rotor or the shaft supported by the bearing, which is not always possible and often entails difficulties in the practical construction.

The present invention relates to an improvement for circulating the lubricating fluid in a bearing from a chamber (housing or stator) surrounding the rotor or shaft.

According to the invention, the lubricating fluid is taken around the axis of the bearing by a plurality of scoops turning coaxially with it and carrying along the fluid towards this axis and discharging it into channels leading to the bearing.

The invention also relates to a mechanical arrangement for circulating the lubricating fluid towards a bearing, and adapted to be realized in such a way as to cooperate as stand by with a lubricated journal bearing in the case of a failure of this bearing. If such a bearing, equipping for example a jet engine of an aircraft, fails during flight of the aircraft, the same can terminate its flight.

The arrangement according to the invention comprises a wheel rotating coaxially with the bearing, equipped at its periphery with blades, inclined in the direction of rotation of this wheel, which sweep an annular space supplied with lubricating fluid in order to scoop up this fluid and to entrain it in a centripetal direction to discharge it under pressure into channels leading to the bearing, and thus to lubricate the same.

In one embodiment of the invention, the wheel is integral with the rotor or with the shaft supported by the bearing and comprises on either side of the inclined blades, two side faces revolving in a fixed element with a small clearance into which the lubricating fluid scooped up by the said inclined blades enters, thereby forming a lubricated or auxiliary journal bearing. The fixed element, i.e., the element which is rotationally inhibited, is preferably mounted with a comparatively large radial clearance from an element (housing or stator) supporting the bearing.

The invention will now be further described, by way of example, with reference to the accompanying drawings in which :

FIG. 1 is an axial half cross-section of a part of a bearing supported by a roller bearing equipped with a lubricating and cooling device according to the invention ; and FIG. 2 is a partial cross-section along the line II—II in FIG. 1.

It can be seen in FIG. 1 that a housing 1 of a turbo engine, not shown, has an axis XX'. The housing supports the outer race 2a of a roller bearing 2 which supports through rollers 2b and an inner race 2c, a hollow shaft 3 which forms part of a rotor of the engine. An annular support 4 is fixed inside the housing 1 by means of a flange 4a, of the support 4 bolted at 5 between two flanges 1a, 1b of the housing. The flange 4a of the support 4 is extended by another flange 4b directed towards the inside, and to which the race 2a of the roller bearing 2 is fixed by bolts 6. The flanges 4a and 4b are connected by a thin cylindrical sheet 4c, having holes 4i in a thicker part 4d which forms inside the support 4 two cylindrical bearing surfaces 4e, 4f which are separated by a deep annular groove 4g. Into this groove 4g lead parallel to the axis XX' one or several tubes 7 which are supplied by pressurized oil.

Inside the annular support 4 is an annular lining 8 comprising opposite the bearing surfaces 4e and 4f, two cylindrical surface 8a, 8b, and opposite the groove 4g a groove 8c forming therewith an annular chamber 9 through the base of which passes a crown with oblique holes 8d (see also FIG. 2) which lead into a cylindrical bearing face 8e forming the inner surface of the lining. The front face of the lining is located opposite the frictionless bearing 2 and has notches 8f which engage into indentations of a flange 4h of the support 4 and are held in these indentations by an extension 8g with holes 8j of the lining resting on the race 2a of the bearing. The radial clearance J1 between the bearing faces 4e, 4f of the support and the bearing faces 8a, 8b of the lining is comparatively large, for example of the order of a millimetre, and the oil contained in the chamber 9 is prevented from escaping through this gap by two segments 10, 11 resting respectively in two grooves 8h, 8i of the lining and resting on the bearing faces 4e, 4f of the support 4. The lining is, therefore, prevented from rotating but can move radially within the limits of the clearance J1.

Opposite the inner cylindrical bearing face 8e of the lining 8 and on either side of the ring of holes 8d, there rotate two external cylindrical bearing faces 12a, 12b of a wheel 12 which is integral with the shaft 3. These bearing faces 12a, 12b form the outer end faces of two sides pieces 12c, 12d which are connected to the hub 12e of the wheel which rests on one side against the race 2c of the bearing 2 and on the other side against a part 13 of the rotor. The annular gap 14 between the side pieces 12c and 12d is divided into several sections by means of inclined blades 15 pointing in the same direction as the holes 8d of the lining. It should be noted that it is still within the scope of the invention if the holes 8d are positioned radially or inclined in the direction opposite to that of the blades 15. These blades extend longitudinally from the side plate 12c to the side plate 12d and radially from the hub 12e of the wheel to the edges 15a which are very slightly set back from the bearing faces 12a and 12b. The base of each channel 16 located between two adjoining blades 15 is pierced by a hole 16a inclined in the same direction as the holes 8d and the channels, and opening to a longitudinal groove 17 of the hub 12e. These grooves 17 are blocked on one side by a continuous surface 12f of the wheel 12 and each leads at the other end into a longitudinal groove 18 of the race 2c, and each groove 18 communicates with lubricating holes 19 of rollers 2b passing through the race 2c. The bearing surface 12b of the wheel located opposite the roller bearing 2 is connected beyond groove 8 with a flange 12g bent towards the outside. The radial clearance J2 between the bearing faces 12a, 12b of the wheel and the bearing face 8e of the lining is substantially smaller than the clearance J1. Its magnitude is, for example, of the order of one-tenth of a millimetre. In the drawings, this clearance has been intentionally exaggerated with a view to clarity.

During operation, the rotor revolves in the direction of the arrow F (FIG. 2). The oil arriving under pressure through the tube or tubes 7 enters the chamber 9, passes through the holes 8d in the direction of the arrow f and is scooped up by the blades 15 which carry it centripetally in the direction of the arrow f1 towards the holes 16a. The oil then passes through the holes 16a owing to their inclined configuration, and enters into the grooves 17 and 18, and through the holes 19 into the bearing 2, where it lubricates the rollers and the races. The holes 8j and 4i for the return flow of the oil prevent an accumulation of oil between the wheel 12 and the bearing 2. The clearance J2 between the surfaces 8e and 12a, 12b during relative movement is smaller than the clearance J1 between the surfaces 8a, 8b and 4e, 4f which are stationary relative to each other, and the lining 8 is centred on the wheel 12 during normal operation. Owing to the smallness of the clearance J2, leakage between the wheel 12 and the lining 8 are very small. The peripheral oil supply of oil to the wheel 12 and the reduction of the clearance J2 substantially improve the cooling of the roller bearing, compared with known arrangements.

If the bearing 2 fails, without blockage, for example if it has excessive play, the non-rotating lining 8 and the wheel 12 form a lubricated journal bearing in which the sliding contact is provided by the facing surfaces 8e and 12a, 12b, which are normally concentric and have a small clearance J2, but make contact under weak eccentricities caused by the failure of the roller bearing 2.

The wheel 12 is mounted integrally on the shaft 3, by locking the hub 12e or by keyways or by any other suitable means.

Obviously, the embodiment just described may be modified, particularly by substituting equivalent means, without thereby departing from the principle of the invention. More particularly, instead of passing through the inner race of a bearing, the oil carried by the blades 15 may act directly on the rotating parts of the bearing for lubricating the same by spraying them through nipples for example. The roller bearing 2 may be replaced by another type of bearing, or by a journal bearing. The lubricating fluid may be an oil mist suspended in air or in another gas.

We claim:

1. A bearing arrangement for a rotatable shaft or rotor, comprising a main bearing and a safety journal bearing comprising a journal member integral with said shaft or rotor, stationary support means, a bearing member defining a radial clearance around said journal member and mounted for radial play in said support means, a chamber defined between said bearing member and said support means, sealing means in said radial play on each side of the chamber to seal the radial clearance while allowing the bearing member to move radially, means for supplying said chamber with lubricating fluid under pressure, and channels in the bearing member to lead said lubricating fluid from said chamber to said radial clearance.

2. A bearing arrangement as claimed in claim 1, comprising an annular chamber defined between the journal member and the bearing member in register with the channels, said journal member having therein passage means leading from said annular chamber to the main bearing, and a plurality of blades in the annular chamber, inclined in the direction of rotation of said shaft or rotor to scoop up said lubricating fluid entering said annular chamber through the channels, to force the fluid in the centripetal direction and to said main bearing through said passage means.

3. A bearing arrangement as claimed in claim 2, in which the channels in said bearing member are inclined in the same direction as the blades.

* * * * *

UNITED STATES PATENT OFFICE
CERTIFICATE OF CORRECTION

Patent No. 3,744,861                     Dated July 10, 1973

Inventor(s) Jean Georges BOUILLER et al

It is certified that error appears in the above-identified patent and that said Letters Patent are hereby corrected as shown below:

In the heading of the patent, in the assignment information, after, "and Lacroix", insert -- assignors to Societe Nationale D'Etude Et De Construction De Moteurs D' Aviation --.

Signed and sealed this 17th day of September 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,744,861                    Dated July 10, 1973

Inventor(s) Jean Georges Bouiller et al.

It is certified that error appears in the above-identified patent and that said Letters Patent are hereby corrected as shown below:

In the heading of the patent, in the assignment information, after, "and Lacroix", insert -- and Bauger and Olivier, legal representatives of the late Louis Jules BAUGER --.

Signed and Sealed this sixteenth Day of December 1975

[SEAL]

Attest:

RUTH C. MASON
*Attesting Officer*

C. MARSHALL DANN
*Commissioner of Patents and Trademarks*